(12) United States Patent
Gotoh et al.

(10) Patent No.: US 8,460,073 B2
(45) Date of Patent: Jun. 11, 2013

(54) AIR CONDITIONER FOR VEHICLE

(75) Inventors: Yoshihiro Gotoh, Chita-gun (JP); Akira Shiraishi, Toyota (JP); Shinichi Naganuma, Takahama (JP)

(73) Assignee: Denso Corporation, Kariya (JP)

( * ) Notice: Subject to any disclaimer, the term of this patent is extended or adjusted under 35 U.S.C. 154(b) by 820 days.

(21) Appl. No.: 12/655,130

(22) Filed: Dec. 23, 2009

(65) Prior Publication Data

US 2010/0167635 A1 Jul. 1, 2010

(30) Foreign Application Priority Data

Dec. 26, 2008 (JP) ................. 2008-333935

(51) Int. Cl.
*B60H 3/00* (2006.01)
(52) U.S. Cl.
USPC .......................................... 454/156; 454/159
(58) Field of Classification Search
USPC ............................ 454/156, 159, 121; 165/42
See application file for complete search history.

(56) References Cited

U.S. PATENT DOCUMENTS

| 5,109,755 | A | 5/1992 | Guillemin |
| 5,884,689 | A | 3/1999 | Takechi et al. |
| 6,296,562 | B1 * | 10/2001 | Uemura et al. ............. 454/121 |
| 7,806,172 | B2 * | 10/2010 | Seki et al. ................. 165/202 |
| 2003/0139132 | A1 | 7/2003 | Derx |
| 2006/0027354 | A1 | 2/2006 | Vincent et al. |

FOREIGN PATENT DOCUMENTS

| FR | 2 650 224 | 7/1989 |
| JP | 10-236134 | 9/1998 |
| JP | 11-348533 | 12/1999 |
| JP | 2000-33814 | 2/2000 |
| JP | 2001-191781 | 7/2001 |

OTHER PUBLICATIONS

Translation of JP11348533.*
Translation of JP2001-191781.*
Translation of JP2000-33814.*
Office action dated Oct. 19, 2010 in corresponding Japanese Application No. 2008-333935.

* cited by examiner

*Primary Examiner* — Steven B McAllister
*Assistant Examiner* — Brittany E Towns
(74) *Attorney, Agent, or Firm* — Harness, Dickey & Pierce, PLC

(57) ABSTRACT

In an air conditioning case of an air conditioner, an air mixing chamber, a warm-air bypass passage, a first warm-air passage and a second warm-air passage are provided. The warm-air bypass passage is located in a part of space, in which the air mixing chamber is provided, and the second warm-air passage is located at an opposite side of the first warm-air passage with respect to the air mixing chamber. The warm air flowing in the warm-air bypass passage makes a U-turn at the second warm-air passage and flows toward the air mixing chamber. Therefore, in the air mixing chamber, the cool air is inserted between the warm air from the first warm-air bypass passage and the warm air from the second warm-air passage, from two sides of the cool air.

10 Claims, 13 Drawing Sheets

US 8,460,073 B2

AIR CONDITIONER FOR VEHICLE

CROSS REFERENCE TO RELATED APPLICATION

The present application is based on Japanese Patent Application No. 2008-333935 filed on Dec. 26, 2008, the disclosure of which is incorporated herein by reference.

FIELD OF THE INVENTION

The present invention relates to an air-mix type air conditioner for a vehicle, that mixes cool, air and warm air.

BACKGROUND OF THE INVENTION

FIG. 10 shows a related art for improving air-mixing performance of cool air and warm air. According to the related art, three-layer streams of cool air and warm air are mixed. As shown in FIG. 10, cool-air passages J2, J3 are provided on both sides of a heating heat exchanger J1. Thus, warm air from the heating heat exchanger J1 is inserted between cool air from the cool-air passage J2 and cool air from the cool-air passage J3, which flow in parallel with the warm air, and the cool air and the warm air are mixed. Compared to the case where two-layer streams of cool air and warm air are mixed, a contact area between the warm air and the cool air is increased and air-mixing performance is improved.

According to JP-A-10-236134, which corresponds to U.S. Pat. No. 5,884,689, and US 2006/0027354, in order to control temperature differences of air blowing from multiple outlet portions, an air conditioner for a vehicle includes a bypass passage, which is arranged across an air mixing chamber, for directly guiding a part of warm air or cool air to the outlet portions of an air conditioning case.

SUMMARY OF THE INVENTION

FIG. 11 shows a cross-sectional view of an air conditioner for a vehicle proposed by the inventors of the present application. In the air conditioner of FIG. 11, in order to reduce in size and weight of the device, volume of an air mixing chamber 17 provided inside an air conditioning case 11 is reduced.

In this way, in the case where the volume of the air mixing chamber 17 is small, a blowing-mode, in which temperature-equalized conditioned air is blown from multiple outlet portions at the same time, cannot be performed because of low air-mixing performance. For example, as shown in FIG. 11, in the case where the conditioned air is blown from a defroster outlet portion 18, a face outlet portion 19 and a foot outlet portion 20 at the same time, a temperature field may be formed in the air mixing chamber 17. That is, a temperature in the air mixing chamber 17 near a warm-air passage 14 becomes high and a temperature in the air mixing chamber 17 near a cool-air passage 15 becomes low. Thus, a temperature of air blowing from the foot outlet portion 20 near the warm-air passage 14 may become high and a temperature of air blowing from the defroster outlet portion 18 near the cool-air passage 15 may become low.

As a measure of the difficulty, in order to improve air-mixing performance, the three-layer streams of cool air and warm air shown in FIG. 10 are applied to the air conditioner shown in FIG. 11. However, in this case, another cool-air passage other than the warm-air passage 14, the cool-air passage 15 and the air mixing chamber 17 needs to be arranged, and two air mixing doors for controlling the ratio of the amount of air in the three air passages need to be arranged.

Further, a space in which these components can move becomes necessary. Accordingly, the size of the air conditioning case 11 of the air conditioner shown in FIG. 11 becomes larger. Thus, the configuration shown in FIG. 10 cannot be applied to the air conditioner shown in FIG. 11.

As another measure of the difficulty, the above-described configuration having the bypass passage can be used. FIG. 12 shows a cross-sectional view of an air conditioner for a vehicle proposed by the inventors of the present application. FIG. 13 is a perspective view of a region A1 in FIG. 12.

FIG. 12 shows a configuration obtained by applying the above-described configuration having the bypass passage to the air conditioner of FIG. 11. A bypass passage J31 shown in FIG. 12 directly introduces a part of warm air from the warm-air passage 14 to the defroster outlet portion 18 and extends from an outlet of the warm-air passage 14 to a portion in front of the defroster outlet portion 18 across the air mixing chamber 17. An outlet opening J32 of the bypass passage J31 is located downstream of the air mixing chamber 17 in an air flow. A flowing direction of warm air in the bypass passage J31 corresponds to a direction toward the defroster outlet portion 18.

As shown in FIG. 13, a cool air flow c1 from the cool-air passage 15 collides with a warm air flow h1 from the warm-air passage 14 and the cool air flow c1 and the warm air flow h1 are mixed outside the bypass passage J31.

Conditioned air obtained by mixing the cool air flow c1 and the warm air flow h1 in the air mixing chamber 17 and warm air flow h3 introduced by the bypass passage J31 are mixed at a downstream side of the air mixing chamber 17, and the mixed air flows into the defroster outlet portion 18. Accordingly, compared to the configuration without a bypass passage shown in FIG. 11, a temperature of air blowing from the defroster outlet portion 18 can be increased.

However, because the bypass passage J31 constantly supplies the warm air flow h3 to the defroster outlet portion 18, the temperature of air blowing from the defroster outlet portion 18 may become higher than those from the face outlet portion 19 and the foot outlet portion 20 even when a ratio of cool air and warm air adjusted by an air mixing door 16 is almost MAXCOOL (i.e., maximum cooling state), as shown in FIG. 14.

FIG. 14 shows a relation between a temperature of air blowing from each of the outlet portions 18, 19, 20 and a ratio of cool air and warm air adjusted by the air mixing door 16, that is, a control property of a temperature of air blowing from each of the outlet portions 18, 19, 20; in the configuration shown in FIG. 12. In a range R1 having a high percentage of cool air, a change in a temperature of air blowing from the defroster outlet portion 18 differs from those from the face outlet portion 19 and the foot outlet portion 20, and the temperature of air blowing from the defroster outlet portion 18 is higher than those from the face outlet portion 19 and the foot outlet portion 20.

This occurs not only when the conditioned air is blown from the defroster outlet portion 18, the face outlet portion 19 and the foot outlet portion 20 at the same time, but also when the conditioned air is blown from two of the outlet portions 18, 19, 20 at the same time or when the conditioned air is blown from a front seat outlet portion and a rear seat outlet portion at the same time.

In view of the above points, it is an object of the present invention to provide an air conditioner for a vehicle, in which an air conditioning case can be reduced in size and control properties of temperatures of air blowing from multiple outlet portions become similar levels.

According to a first aspect of the present invention, an air conditioner for a vehicle includes an air conditioning case defining an air passage through which air flows to a vehicle compartment and a heating heat exchanger configured to heat the air. The heating heat exchanger is arranged inside the air conditioning case. The air passage includes a first warm-air passage in which warm air having passed through the heating heat exchanger flows; a cool-air passage in which cool air flows while bypassing the heating heat exchanger; an air mixing chamber located at a junction of the first warm-air passage and the cool-air passage such that the warm air flowing from the first warm-air passage and the cool air flowing from the cool-air passage are mixed to obtain conditioned air having a desired temperature; a plurality of outlet portions provided at a downstream portion of the air conditioning case downstream of the air mixing chamber in an air flow such that the conditioned air is blown from the plurality of outlet portions to a plurality of regions in the vehicle compartment; a warm-air bypass passage configured to introduce a part of the warm air from the heating heat exchanger into a predetermined area, which is opposite to the first warm-air passage with respect to the air mixing chamber, the warm-air bypass passage extending across the air mixing chamber; and a second warm-air passage communicating with the warm-air bypass passage, the second warm-air passage being provided at the predetermined area. The second warm-air passage is arranged to change a flowing direction of the warm air from the warm-air bypass passage to an opposite direction with respect to a flowing direction of the warm air from the first warm-air passage and to introduce the warm air toward the air mixing chamber. The first warm-air passage and the second warm-air passage are arranged such that the cool air flowing from the cool-air passage to the air mixing chamber is inserted between the warm air from the first warm-air passage and the warm air from the second warm-air passage, from two sides of the cool air.

In the above configuration, the warm air flowing from the first and second warm-air passages and the cool air flowing from the cool-air passage can be mixed in the air mixing chamber.

The cool air flowing from the cool-air passage to the air mixing chamber is inserted between the warm air from the first warm-air passage and the warm air from the second warm-air passage. Thus, a contact area between the warm air and the cool air is increased and air-mixing performance is improved.

The conditioned air obtained by mixing the warm air and the cool air in the air mixing chamber can be flowed to the outlet portions. Thus, temperatures of the conditioned air blown from the outlet portions can be equalized, and control properties of temperatures of air blowing from the outlet portions can become similar levels.

The warm-air bypass passage is arranged in a part of space inside the air conditioning case, in which the air mixing chamber is formed. Thus, expanding the size of the air conditioning case can be restricted.

Further, because a part of the warm air from the heating heat exchanger flows into the warm-air bypass passage, the amount of the warm air flowing in the warm-air bypass passage does not need to be adjusted by an air mixing door. Thus, two air mixing doors are not necessary, and expanding the size of the air conditioning case can be restricted.

According to a second aspect of the present invention, an air conditioner for a vehicle includes an air conditioning case defining an air passage through which air flows to a vehicle compartment and a heating heat exchanger configured to heat the air. The heating heat exchanger is arranged inside the air conditioning case. The air passage includes a warm-air passage in which the heating heat exchanger is arranged; a first cool-air passage in which cool air flows while bypassing the heating heat exchanger; an air mixing chamber located at a junction of the warm-air passage and the first cool-air passage such that a warm, air flowing from the heating heat exchanger and the cool air flowing from the first cool-air passage are mixed to obtain conditioned air having a desired temperature; a plurality of outlet portions provided at a downstream portion of the air conditioning case downstream of the air mixing chamber in an air flow such that the conditioned air is blown from the plurality of outlet portions to a plurality of regions in the vehicle compartment; a cool-air bypass passage configured to introduce a part of the cool air flowing in the first cool-air passage while bypassing the heater core into a predetermined area, which is opposite to the first cool-air passage with respect to the air mixing chamber, the cool-air bypass passage extending across the air mixing chamber; and a second cool-air passage communicating with the cool-air bypass passage, the second cool-air passage being provided at the predetermined area. The second cool-air passage is arranged to change a flowing direction of the cool air from the cool-air bypass passage to an opposite direction with respect to a flowing direction of the cool air from the first cool-air passage and to introduce the cool air toward the air mixing chamber. The first cool-air passage and the second cool-air passage are arranged such that the warm air flowing from the heating heat exchanger to the air mixing chamber is inserted between the cool air from the first cool-air passage and the cool air from the second cool-air passage, from two sides of the cool air.

In the above configuration, the cool air flowing from the first and second cool-air passages and the warm air flowing from the heating heat exchanger can be mixed in the air mixing chamber.

The warm air flowing from the heating heat exchanger to the air mixing chamber is inserted between the cool air from the first cool-air passage and the cool air from the second cool-air passage. Thus, a contact area between the warm air and the cool air is increased and air-mixing performance is improved.

The conditioned air obtained by mixing the warm air and the cool air in the air mixing chamber can be flowed to the outlet portions. Thus, temperatures of the conditioned air blown from the outlet portions can be equalized, and control properties of temperatures of air blowing from the outlet portions can become similar levels.

The cool-air bypass passage is arranged in a part of space inside the air conditioning case, in which the air mixing chamber is formed. Thus, expanding the size of the air conditioning case can be restricted.

Further, because a part of the cool air flows into the cool-air bypass passage while bypassing the heating heat exchanger, the amount of the cool air flowing in the cool-air bypass passage does not need to be adjusted by an air mixing door. Thus, two air mixing doors are not necessary, and expanding the size of the air conditioning case can be restricted.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
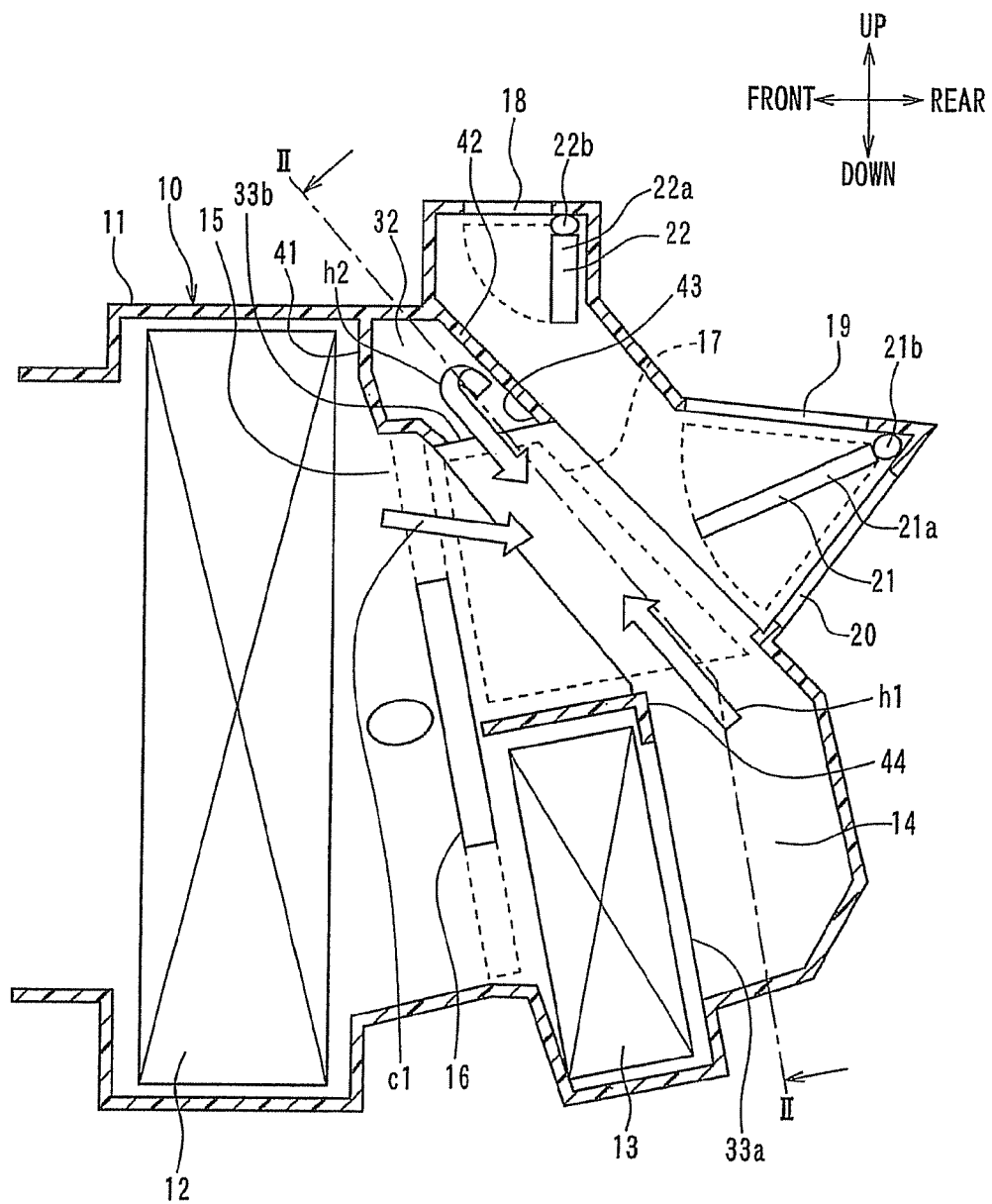
FIG. 1 is a cross-sectional view showing an air conditioner for a vehicle according to a first embodiment of the present invention.
Figure 2:
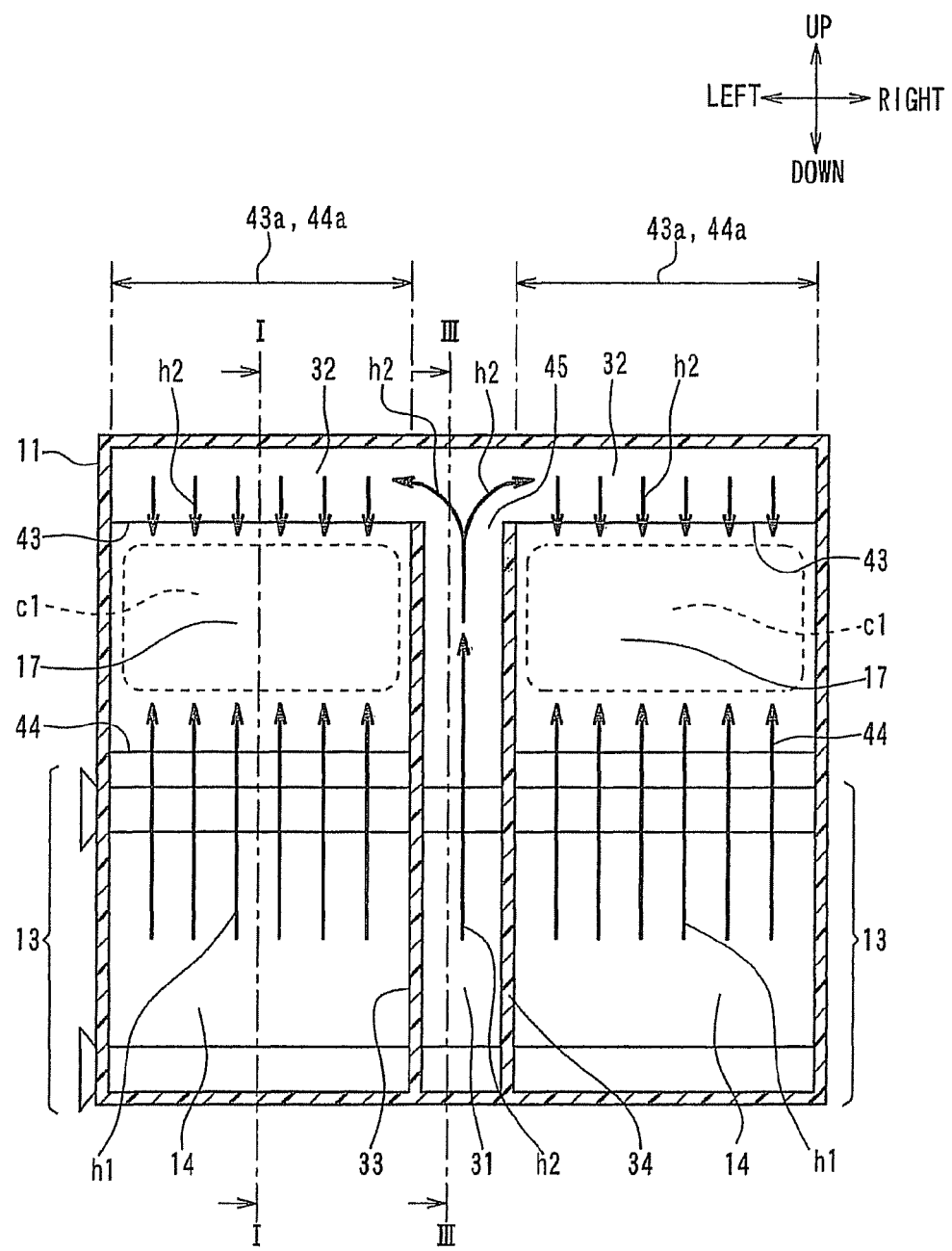
FIG. 2 is a cross-sectional view taken along line II-II in FIG. 1.
Figure 3:
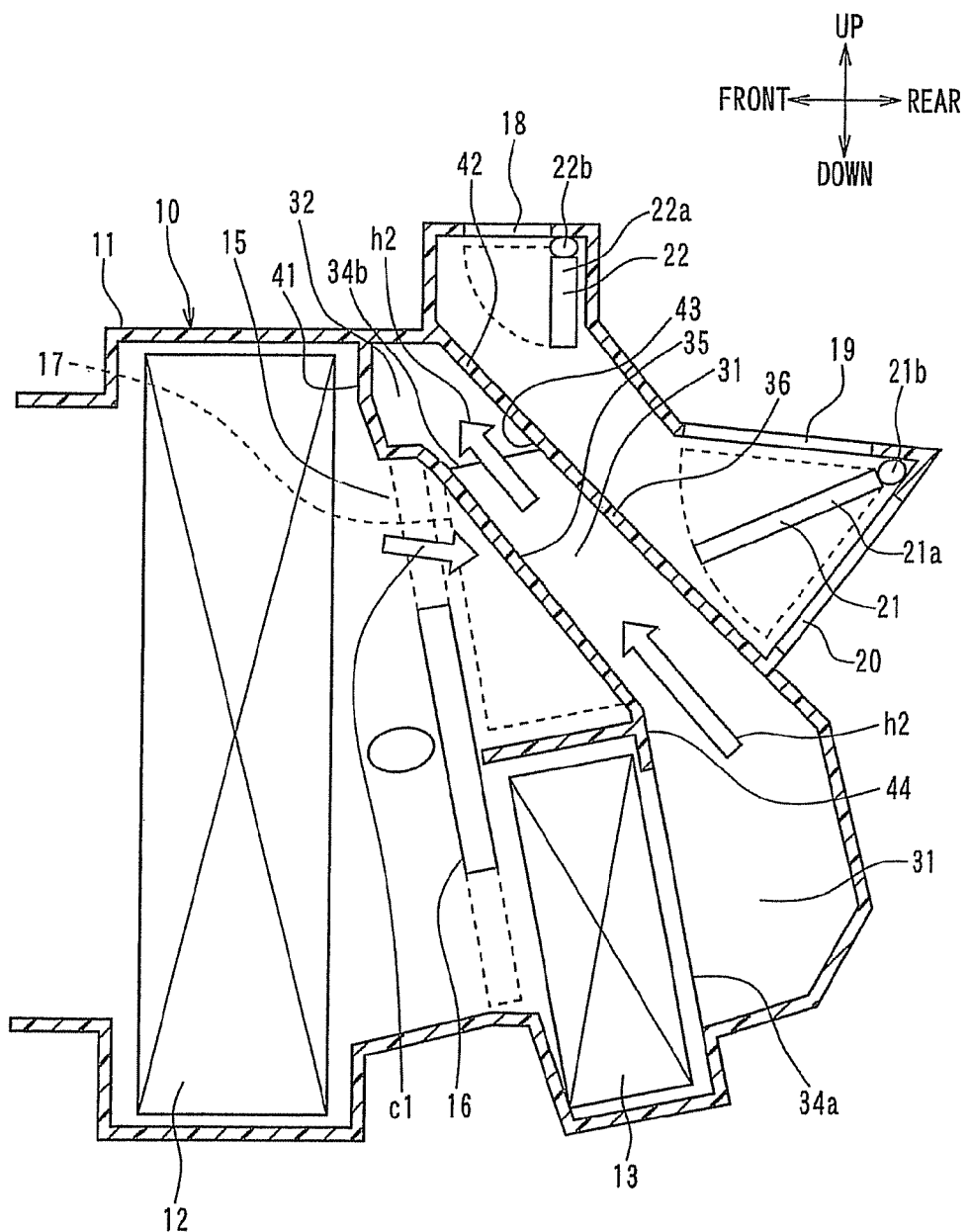
FIG. 3 is a cross-sectional view taken along line in FIG. 2.

FIG. 1 is a cross-sectional view showing an air conditioner for a vehicle of the present embodiment. FIG. 2 is a cross-sectional view taken along line II-II in FIG. 1. FIG. 3 is a cross-sectional view taken along line in FIG. 2. FIG. 1 is a cross-sectional view taken along line I-I in FIG. 2. Directions of arrows in FIGS. 1 to 3 show directions in a state that the air conditioner is mounted to a vehicle.

The air conditioner includes a room air conditioning unit. The room air conditioning unit is arranged inside a vehicle instrument panel (not shown in the drawings) provided at a front part of a vehicle compartment. The room air conditioning unit includes a blower fan unit (not shown in the drawings) and an air-conditioning main unit 10 shown in FIG. 1.

The air-conditioning main unit 10 is arranged at an approximately center portion in a vehicle width direction. The blower fan unit is arranged at a side of a front passenger seat with spaced apart by a predetermined dimension from the air-conditioning main unit 10. The blower fan unit includes an air inlet door assy that switches to introduce internal/external air and a blower fan, and the introduced air is blown into the air-conditioning main unit 10 by the blower fan.

As shown in FIG. 1, the air-conditioning main unit 10 houses an evaporator 12 and a heater core 13 inside an air conditioning case 11. The air conditioning case 11 defines an air passage and is made of a resin material. Air is blown from the blower fan unit toward the front side of the air conditioning case 11.

The evaporator 12 is a cooling heat exchanger that cools air by exchanging heat between a refrigerant flowing in the evaporator 12 and air flowing in the air conditioning case 11. The evaporator 12 is arranged at the front side in the air conditioning case 11 and cools the air blown from the blower fan unit. Thus, air having passed through the evaporator 12 becomes cool air.

The heater core 13 is a heating heat exchanger that heats air by exchanging heat between an engine coolant and the air having passed through the evaporator 12. Thus, air having passed through the heater core 13 becomes warm air. The heater core 13 is arranged at a position behind the evaporator 12 and at a lower side in the air conditioning case 11.

A first warm-air passage 14 through which the warm air from the heater core 13 flows is provided behind the heater core 13 in the air conditioning case 11. The first warm-air passage 14 extends upward from just behind the heater core 13.

A cool-air passage 15 is provided behind the evaporator 12 and over the heater core 13 in the air conditioning case 11. The cool air from the evaporator 12 flows through the cool-air passage 15 while bypassing the heater core 13. The cool-air passage 15 is configured such that the cool air flows rearward from the evaporator 12.

An air mixing door 16 is arranged behind the evaporator 12 and in front of the heater core 13 in the air conditioning case 11. The air mixing door 16 controls the ratio of the amount of air flowing through the heater core 13 and the amount of air flowing through the cool-air passage 15. The air mixing door 16 is constructed of a sliding door, for example.

An air mixing chamber 17 is provided behind the evaporator 12 and over the heater core 13 in the air conditioning case 11. In the air mixing chamber 17, the cool air from the cool-air passage 15 collides with the warm air from the first warm-air passage 14, and the cool air and the warm air are mixed.

The air mixing chamber 17 is located at a junction of the cool-air passage 15 and the first warm-air passage 14, that is, the most upstream position at which the cool air and the warm air are mixed. In the present embodiment, the air mixing chamber 17 is located at a position, at which a flowing direction of the cool air from the cool-air passage 15 intersects with a flowing direction of the warm air from the first warm-air passage 14, and upstream of motional range of blowing-mode doors described below in an air flow.

The flowing direction of the cool air to the air mixing chamber 17 from the cool-air passage 15 is obliquely downward with respect to a vehicle rear side, and the flowing direction of the warm air to the air mixing chamber 17 from the first warm-air passage 14 is obliquely upward with respect to a vehicle front side. Thus, the flowing direction of the cool air from the cool-air passage 15 intersects with the flowing direction of the warm air from the first warm-air passage 14.

A defroster outlet portion 18, a face outlet portion 19 and a foot outlet portion 20 as multiple outlet portions are provided on the air conditioning case 11 and are located downstream of the air mixing chamber 17 in an air flow. The defroster outlet portion 18 is provided such that conditioned air is blown to an inner surface of a wind shield glass. The face outlet portion 19 is provided such that conditioned air is blown to upper bodies of passengers. The foot outlet portion 20 is provided such that conditioned air is blown to feet of passengers.

The defroster outlet portion 18 communicates with the air mixing chamber 17 near the cool-air passage 15, and the foot outlet portion 20 communicates with the air mixing chamber 17 near the first warm-air passage 14. The face outlet portion 19 is arranged adjacent to and in front of the foot outlet portion 20.

The blowing-mode doors that selectively open and close the outlet portions are arranged in the air conditioning case 11. Specifically, a face/foot door 21 that opens and closes the face outlet portion 19 and the foot outlet portion 20, and a defroster door 22 that opens and closes the defroster outlet portion 18 are arranged. The face/foot door 21 is constructed of a plate-like door portion 21a that opens and closes the face outlet portion 19 and the foot outlet portion 20, and a rotational shaft 21b that rotates the door portion 21a. The defroster door 22 is constructed of a plate-like door portion 22a that opens and closes the defroster outlet portion 18, and a rotational shaft 22b that rotates the door portion 22a.

Next, features of the present embodiment will be described. As shown in FIGS. 2 and 3, a warm-air bypass passage 31 and a second warm-air passage 32 are provided inside the air conditioning case 11.

The warm-air bypass passage 31 is different from the first warm-air passage 14. The warm-air bypass passage 31 introduces a part of the warm air from the heater core 13 into an area above the air mixing chamber 17, which is opposite to the first warm-air passage 14 with respect to the air mixing chamber 17. The warm-air bypass passage 31 extends across the air mixing chamber 17.

As shown in FIG. 2, the warm-air bypass passage 31 is located at the center of a region including the air mixing chamber 17 in the vehicle width direction inside the air conditioning case 11. As shown in FIGS. 2 and 3, the warm-air bypass passage 31 extends to an upper end portion of the air mixing chamber 17 from just behind the heater core 13. Thus, at a portion just behind the heater core 13, a part of the warm air flows directly into the warm-air bypass passage 31 and the rest of the warm air flows into the first warm-air passage 14.

As shown in FIGS. 2 and 3, a space including the air mixing chamber 17 inside the air conditioning case 11 is divided by walls 33, 34, 35, 36 that define the air mixing chamber 17 and the warm-air bypass passage 31 so that the warm-air bypass passage 31 is formed.

In particular, as shown in FIG. 2, the walls 33, 34 are warm-air partition walls 33, 34 that divide the inside of the air conditioning case 11 in the vehicle width direction. As shown in FIG. 3, the walls 35, 36 are a cool-air blocking wall 35 and a warm-air blocking wall 36 that divide the inside of the air conditioning case 11 into a side of the cool-air passage 15 and a side of the outlet portions 18, 19, 20.

The warm-air partition walls 33, 34 are arranged from a lower end of the air conditioning case 11 toward an upper portion thereof above the air mixing chamber 17. That is, as shown in FIGS. 1 and 3, warm-air flow upstream end portions 33a, 34a of the warm-air partition walls 33, 34 are located just behind the heater core 13. Thus, in the region from behind the heater core 13 to the air mixing chamber 17, the warm-air bypass passage 31 is arranged in parallel with the first warm-air passage 14 in the vehicle width direction. In contrast, warm-air flow downstream end portions 33b, 34b of the warm-air partition walls 33, 34 are located at an upper end of an outlet opening of the cool-air passage 15.

The cool-air blocking wall 35 and the warm-air blocking wall 36 are arranged only in the space including the air mixing chamber 17 inside the air conditioning case 11. The cool-air blocking wall 35 is a wall of the warm-air bypass passage 31, which is opposed to cool air. The cool-air blocking wall 35 blocks the cool air from the cool-air passage 15, and prevents the cool air from entering into the warm-air bypass passage 31. The warm-air blocking wall 36 is a wall that is opposed to a space at a side of the outlet portions 18, 19, 20. The warm-air blocking wall 36 prevents the warm air flowing in the warm-air bypass passage 31 from flowing into the outlet portions 18, 19, 20.

The cool-air blocking wall 35 and the warm-air blocking wall 36 have a flat plate shape, and extend in a direction approximately parallel to the flowing direction of the warm air to the air mixing chamber 17 from the first warm-air passage 14. Thus, as well as the flowing direction of the warm air from the first warm-air passage 14, warm air flows upward also in the warm-air bypass passage 31. The cool-air blocking wall 35 and the warm-air blocking wall 36 may have a curved shape in the vehicle width direction.

For example, the walls 33, 34, 35, 36 are formed integrally with the air conditioning case 11 by using the same resin material, or the walls 33, 34, 35, 36 are formed separately from the air conditioning case 11, then fixed to the air conditioning case 11.

In contrast, the second warm-air passage 32 is located above the cool-air passage 15 and the air mixing chamber 17 in the air conditioning case 11, that is, at the opposite side of the first warm-air passage 14 with respect to the air mixing chamber 17 in the air conditioning case 11. The second warm-air passage 32 communicates with the warm-air bypass passage 31 at a warm-air flow downstream side, and is configured such that a direction of warm air flow h2 flowing in the warm-air bypass passage 31 is changed to a downward direction and the warm air flow h2 flows to the air mixing chamber 17.

The second warm-air passage 32 is located between the cool-air passage 15 and a defroster passage for introducing conditioned air into the defroster outlet portion 18. In the present embodiment, a cool-air passage partition wall 41 and a defroster partition wall 42 divide the inside of the air conditioning case 11 in a vehicle front-rear direction so that the second warm-air passage 32 is formed. The cool-air passage partition wall 41 is arranged in the air conditioning case 11 so as to form the cool-air passage 15. The defroster partition wall 42 is arranged in the air conditioning case 11 so as to introduce conditioned air into the defroster outlet portion 18 from the air mixing chamber 17.

An outlet opening 43 of the second warm-air passage 32 is opposed to an outlet opening 44 of the first warm-air passage 14, and is located on an extended line of the blowing direction of the warm air from the outlet opening 44 of the first warm-air passage 14. The cool-air passage partition wall 41 and the defroster partition wall 42 extend approximately parallel to the cool-air blocking wall 35 and the warm-air blocking wall 36, respectively.

Thus, the flowing direction of the warm air from the second warm-air passage 32 is direct opposite to the flowing direction of the warm air from the first warm-air passage 14, and the warm air flows from the outlet opening 43 of the second warm-air passage 32 toward the outlet opening 44 of the first warm-air passage 14. In particular, the flowing direction of the warm air from the second warm-air passage 32 is obliquely downward with respect to the vehicle rear side. Hence, the flowing direction of the warm air from the second warm-air passage 32 is not parallel to but intersects with the flowing direction of the cool air from the cool-air passage 15.

As shown in FIG. 2, in the second warm-air passage 32, a flowing direction of the warm air from the warm-air bypass passage 31 through an inlet opening 45 is direct opposite to the flowing direction of the warm air through the outlet opening 43.

As shown in FIG. 2, a dimension of the second warm-air passage 32 in the vehicle width direction is larger than that in a vehicle up-down direction. A dimension 43a of the outlet opening 43 in the vehicle width direction is equal to a dimension 44a of the outlet opening 44, which is opposed to the outlet opening 43, in the vehicle width direction. In the present embodiment, the warm-air bypass passage 31 is arranged between the two first warm-air passages 14 in the vehicle width direction. Thus, the second warm-air passage 32 has two outlet openings 43. The dimension 43a of each of the two outlet openings 43 in the vehicle width direction is equal to the dimension 44a of each of the opposed outlet openings 44.

Next, an air flow when the air conditioner of the present embodiment performs an all outlet portions blowing-mode will be described. The all outlet portions blowing-mode is one of blowing-modes that blow conditioned air to the vehicle compartment. In the all outlet portions blowing-mode, the conditioned air is blown from the defroster outlet portion 18, the face outlet portion 19 and the foot outlet portion 20 at the same time.

Figure 4:
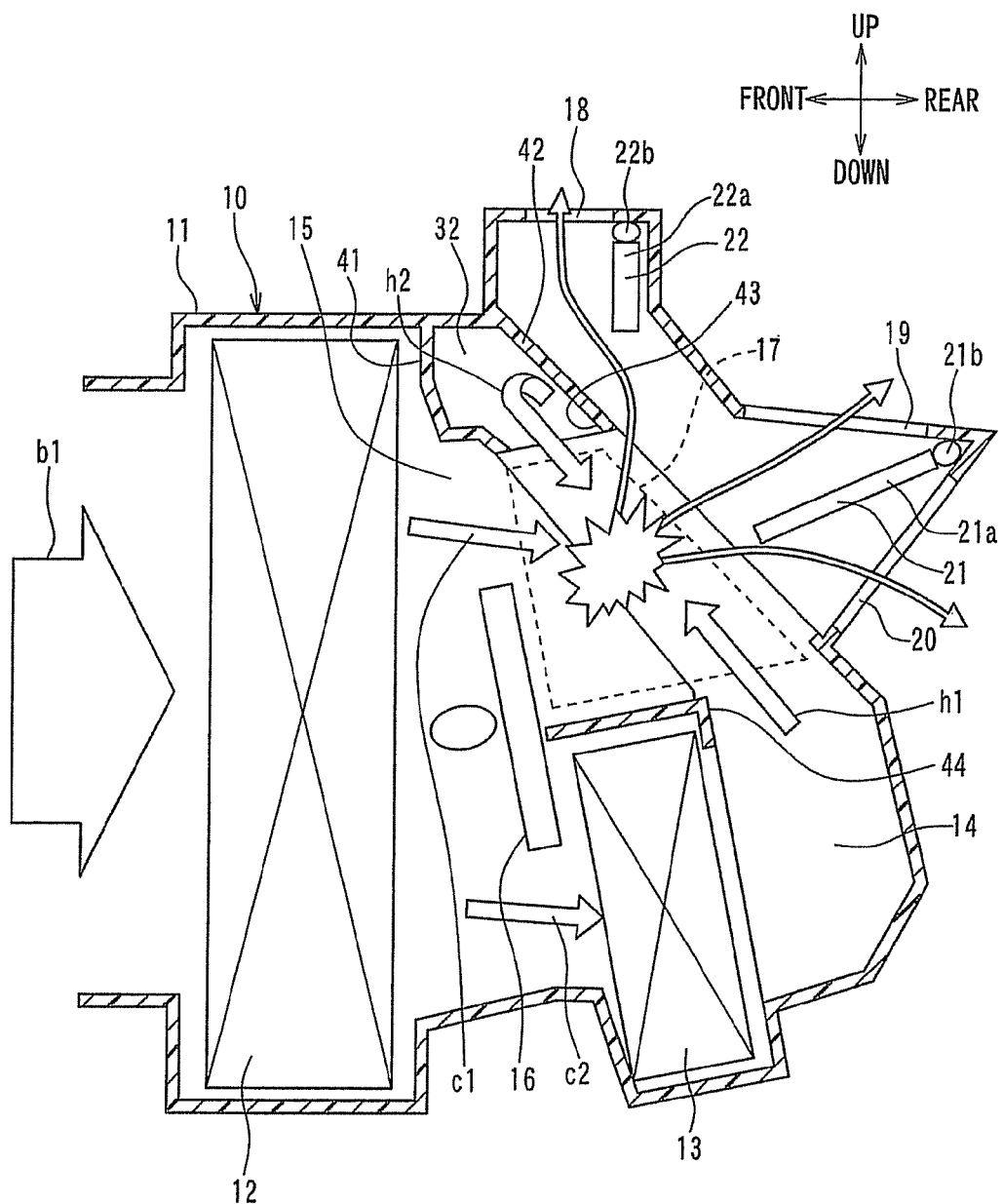
FIG. 4 is a cross-sectional view showing an air flow in an all outlet portions blowing-mode of the air conditioner shown in FIG. 1.

FIG. 4 shows the air flow in the all outlet portions blowing-mode. FIG. 4 corresponds to FIG. 1.

As shown in FIG. 4, an air flow b1 blowing from the blower fan unit is introduced into the evaporator 12. The cool air having passed through the evaporator 12 is branched into a cool air flow c1 flowing in the cool-air passage 15 and a cool air flow c2 flowing toward the heater core 13 by the air mixing door 16. The cool air flow c1 flowing in the cool-air passage 15 directly flows into the air mixing chamber 17.

In contrast, as shown in FIG. 2, the warm air having passed through the heater core 13 is branched just behind the heater core 13 into the warm air flow h1 flowing in the first warm-air passage 14 and the warm air flow h2 flowing in the warm-air bypass passage 31.

As shown in FIGS. 2 and 4, the warm air flow h1 flowing in the first warm-air passage 14 flows upward from the outlet opening 44 and flows toward the cool air flow c1 having flowed into the air mixing chamber 17. The warm air flow h2 flowing in the warm-air bypass passage 31 flows upward and makes a U-turn at the second warm-air passage 32. Then, the warm air flow h2 flows downward from the outlet opening 43 of the second warm-air passage 32 and flows toward the cool air flow c1 having flowed into the air mixing chamber 17.

Therefore, the warm air flow h1 and the warm air flow h2 flow into the air mixing chamber 17 from two directions, that is, upward and downward directions, so that the cool air flow c1 flowing toward the vehicle rear side is inserted between the warm air flow h1 and the warm air flow h2. In other words, the flowing direction of the cool air flow c1 intersects with the flowing directions of the warm air flows h1 and h2. Then, the warm air flow h1, the warm air flow h2 and the cool air flow c1 are mixed.

The cool air and the warm air are mixed in the air mixing chamber 17 to generate conditioned air that is adjusted to a desired temperature. The conditioned air is branched and flows toward the defroster outlet portion 18, the face outlet portion 19 and the foot outlet portion 20. Thus, the conditioned air is blown from the outlet portions 18, 19, 20 to the vehicle compartment.

Figure 11:
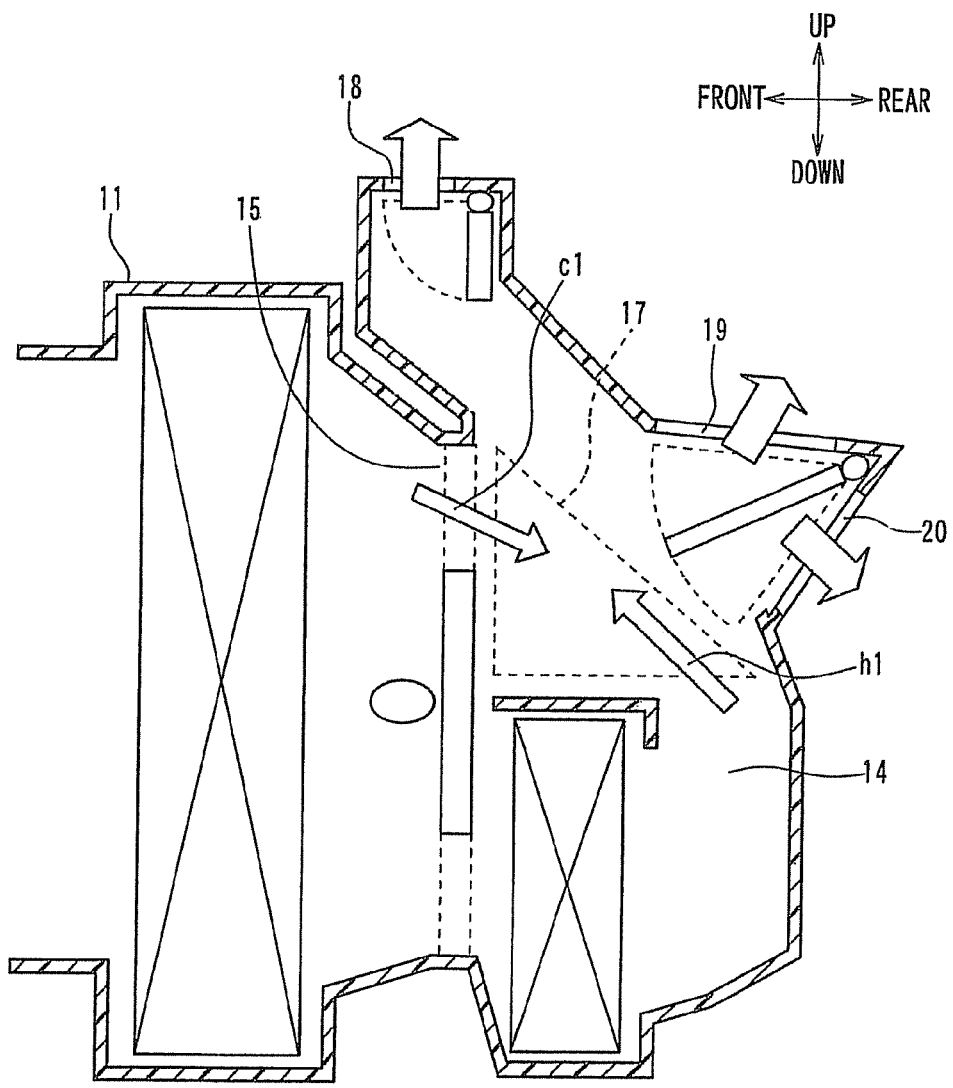
FIG. 11 is a cross-sectional view showing an air conditioner for a vehicle of a comparative example proposed by the inventors of the present application.

For example, in the configuration shown in FIG. 11, a temperature field may be formed in the air mixing chamber 17, that is, a temperature in the air mixing chamber 17 near the warm-air passage 14 becomes high and a temperature in the air mixing chamber 17 near the cool-air passage 15 becomes low. Thus, a temperature of air blowing from the foot outlet portion 20 near the warm-air passage 14 may become high and a temperature of air blowing from the defroster outlet portion 18 near the cool-air passage 15 may become low.

In contrast, in the present embodiment, the outlet opening 43 of the second warm-air passage 32 is located at a side of the defroster outlet portion 18 and the outlet opening 44 of the first warm-air passage 14 is located at a side of the foot outlet portion 20. Thus, the similar effect in the case where heat sources are provided near both the defroster outlet portion 18 and the foot outlet portion 20 can be obtained. According to the present embodiment, the difficulty that a temperature of air blowing from the foot outlet portion 20 becomes high and a temperature of air blowing from the defroster outlet portion 18 becomes low can be solved.

Figure 12:
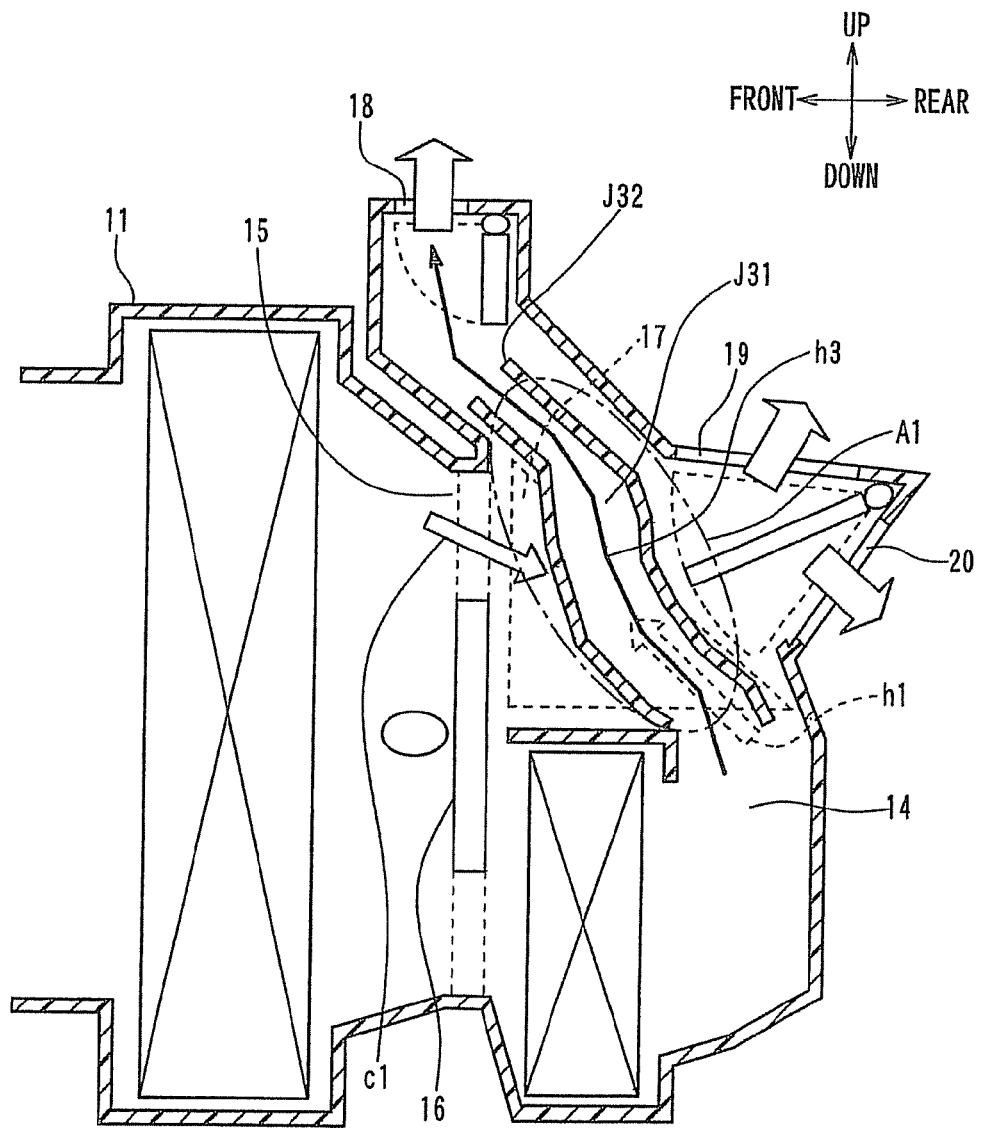
FIG. 12 is a cross-sectional view showing an air conditioner for a vehicle of a comparative example proposed by the inventors of the present application.
Figure 13:
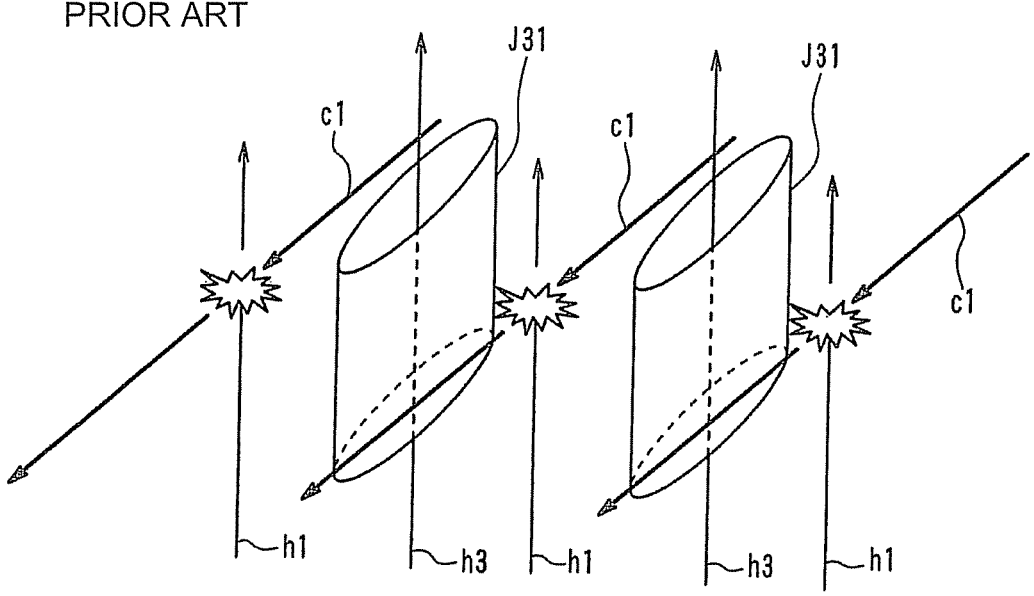
FIG. 13 is a perspective view showing a region A1 in FIG. 12.
Figure 14:
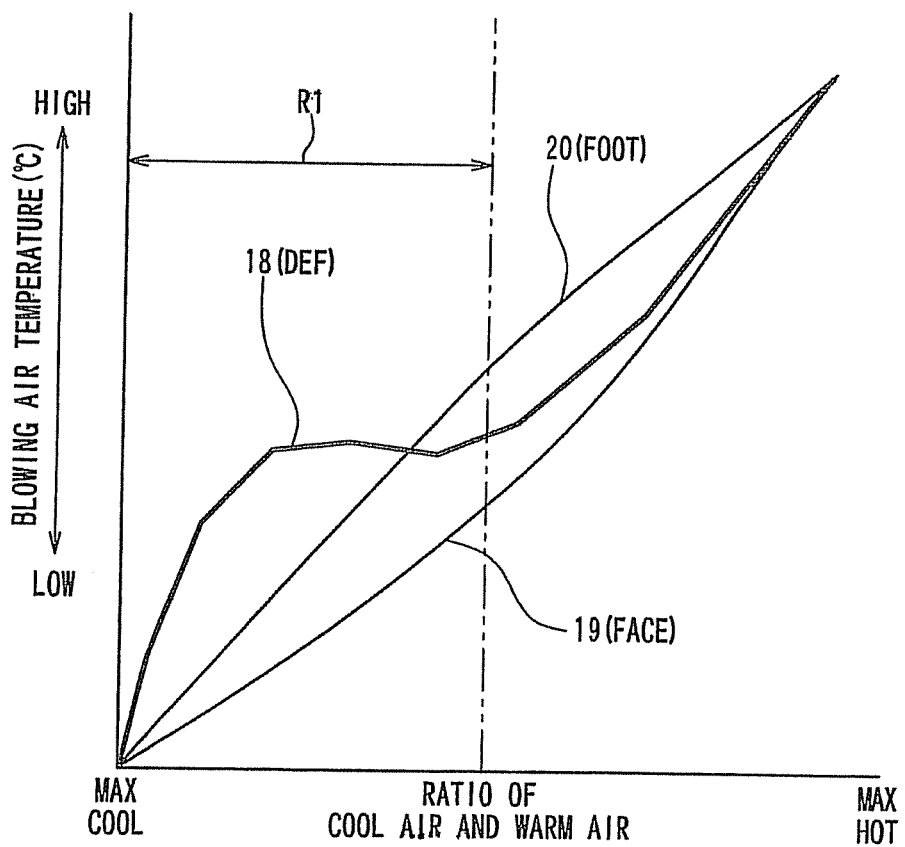
FIG. 14 is a graph showing a control property of a temperature of air blowing from each of outlet portions in the air conditioner shown in FIG. 12.

In the configuration shown in FIG. 12, a part of the warm air flow h3 from the warm-air passage 14 is directly guided to the defroster outlet portion 18 by the bypass passage J31, the conditioned air having passed through the air mixing chamber 17 and the warm air flow h3 guided by the bypass, passage J31 are mixed at the downstream side of the air mixing chamber 17, and the mixed air flows into the defroster outlet portion 18. Thus, as shown in FIG. 14, in a range R1 having a high percentage of cool air, a temperature of air blowing from the defroster outlet portion 18 becomes higher than those from the face outlet portion 19 and the foot outlet portion 20.

In contrast, in the present embodiment, by using the warm-air bypass passage 31 and the second warm-air passage 32, a flowing direction of a part of the warm air from the heater core 13 is changed from an upward direction to a downward direction after crossing the air mixing chamber 17, and thereby the warm air flows toward the outlet opening 44 of the first warm-air passage 14. Thus, the warm air flow h1 flowing from the first warm-air passage 14, the warm air flow h2 flowing from the second warm-air passage 32 and the cool air flow c1 flowing from the cool-air passage 15 can be mixed in the air mixing chamber 17.

At this time, the warm air flow h1 and the warm air flow h2 flow into the air mixing chamber 17 from the upward and downward directions so that the cool air flow c1 flowing toward the vehicle rear side is inserted between the warm air flow h1 and the warm air flow h2, and thereby the warm air flow h1 and the warm air flow h2 are in contact with upper and lower sides of the cool air flow c1. Thus, compared to the case where only the warm air flow h1 is in contact with a lower side of the cool air flow c1 in the configuration shown in FIG. 11 without the warm-air bypass passage 31 and the second warm-air passage 32, a contact area between the warm air and the cool air is increased and air-mixing performance is improved.

Accordingly, in the present embodiment, the conditioned air obtained by mixing the warm air and the cool air in the air mixing chamber 17 can constantly flow to the outlet portions 18, 19, 20 and temperatures of the conditioned air blown from the outlet portions 18, 19, 20 can be equalized.

Figure 5:
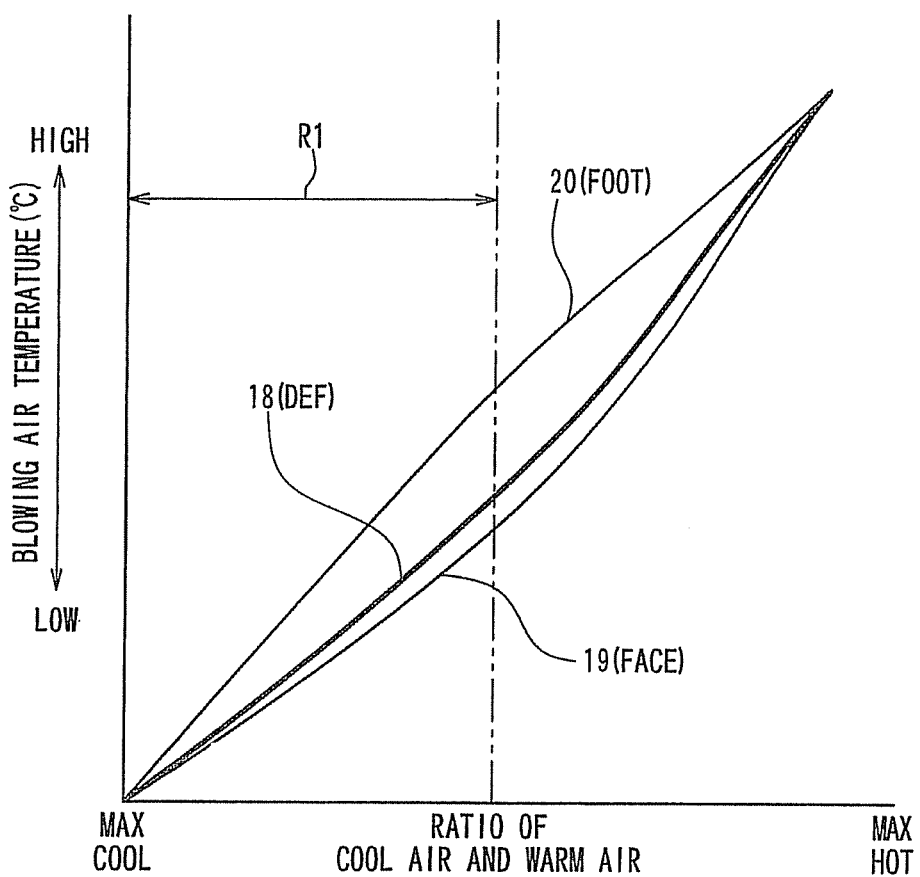
FIG. 5 is a graph showing a control property of a temperature of air blowing from each of outlet portions in the air conditioner according to the first embodiment of the present invention.

According to the present embodiment, as can be seen from the control property of each of the outlet portions shown in FIG. 5, a temperature of air blowing from the defroster outlet portion 18 can be close to those from the face outlet portion 19 and the foot outlet portion 20 even in a range R1 having a high percentage of cool air. That is, a linear property of the control property of a temperature of air blowing from the defroster outlet portion 18 can be ensured. Therefore, according to the present embodiment, control properties of temperatures of air blowing from the outlet portions become similar levels in a whole range of ratio of cool air and warm air.

In the present embodiment, the conditioned air obtained by mixing the warm air and the cool air in the air mixing chamber 17 is branched and flows to the outlet portions. Other than the all output portions blowing-mode, control properties of temperatures of air blowing from the outlet portions can become similar levels even when the conditioned air is blown from two of the defroster outlet portion 18, the face outlet portion 19 and the foot outlet portion 20.

In the present embodiment, the warm-air bypass passage 31 is arranged parallel with the first warm-air passage 14 in the vehicle width direction, and the dimension 43a of the outlet opening 43 of the second warm-air passage 32 in the vehicle width direction is equal to the dimension 44a of the outlet opening 44 of the first warm-air passage 14 in the vehicle width direction. In the air mixing chamber 17, the cool air flow c1 is inserted between the warm air flow h1 and the warm air flow h2 flowing from the upward and downward directions in the whole vehicle width direction. Therefore, compared to the case where the cool air flow c1 is inserted between the warm air flows only in a part in the vehicle width direction, air-mixing performance can be improved.

Further, according to the present embodiment, the air conditioning case can be reduced in size by the following reasons.

In the present embodiment, the warm-air bypass passage 31 is arranged in a part of space inside the air conditioning case 11, in which the air mixing chamber 17 is formed. Therefore, compared to the case where a warm-air passage is arranged in another part different from the space inside the air conditioning case 11, in which the air mixing chamber 17 is formed, expanding the size of the air conditioning case 11 can be restricted.

Figure 10:
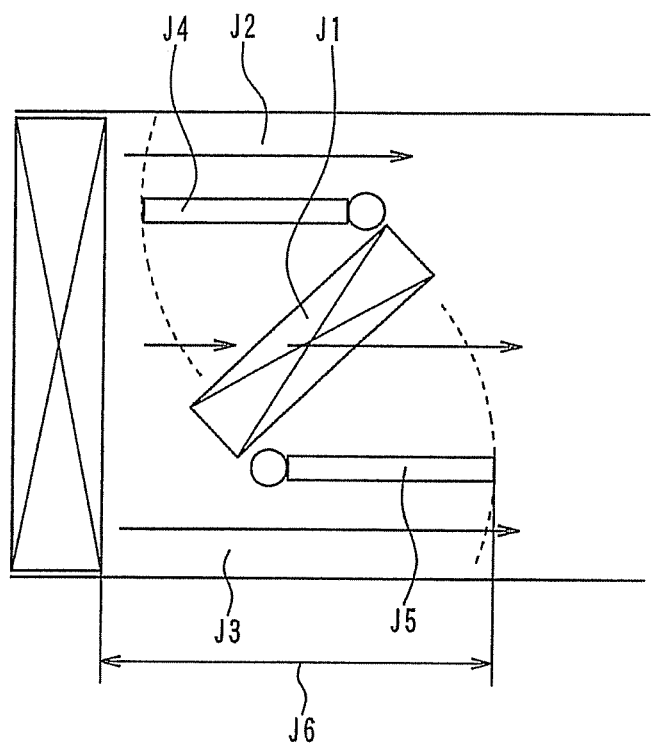
FIG. 10 is a schematic view showing a method for mixing cool air and warm air according to a related art.

In the present embodiment, the ratio of the warm air is adjusted by the air mixing door 16 and a part of the adjusted warm air flows in the warm-air bypass passage 31, and hence, the amount of the warm air flowing in the warm-air bypass passage 31 does not need to be adjusted. Thus, as the art for mixing the three-layer streams of cool air and warm air shown in FIG. 10, two air mixing doors are not necessary. Therefore, compared to the case where the configuration shown in FIG. 10 is applied to the air conditioner shown in FIG. 11, expanding the size of the air conditioning case 11 can be restricted.

Further, the air conditioner of the present embodiment has the same configuration with the air conditioner shown in FIG. 11 with the second warm-air passage 32. The second warm-air passage 32 changes the direction of the warm air flowing in the warm-air bypass passage 31. A space for mounting the second warm-air passage 32 in the air conditioning case 11 can be reduced. Thus, expanding the size of the air conditioning case 11 can be restricted.

In particular, in the present embodiment, the second warm-air passage 32 is arranged between the cool-air passage 15 and the defroster passage. That is, a space between the cool-air passage 15 and the defroster passage is used for arranging the second warm-air passage 32. Thus, expanding the size of the air conditioning case 11 can be restricted.

Second Embodiment

Figure 6:
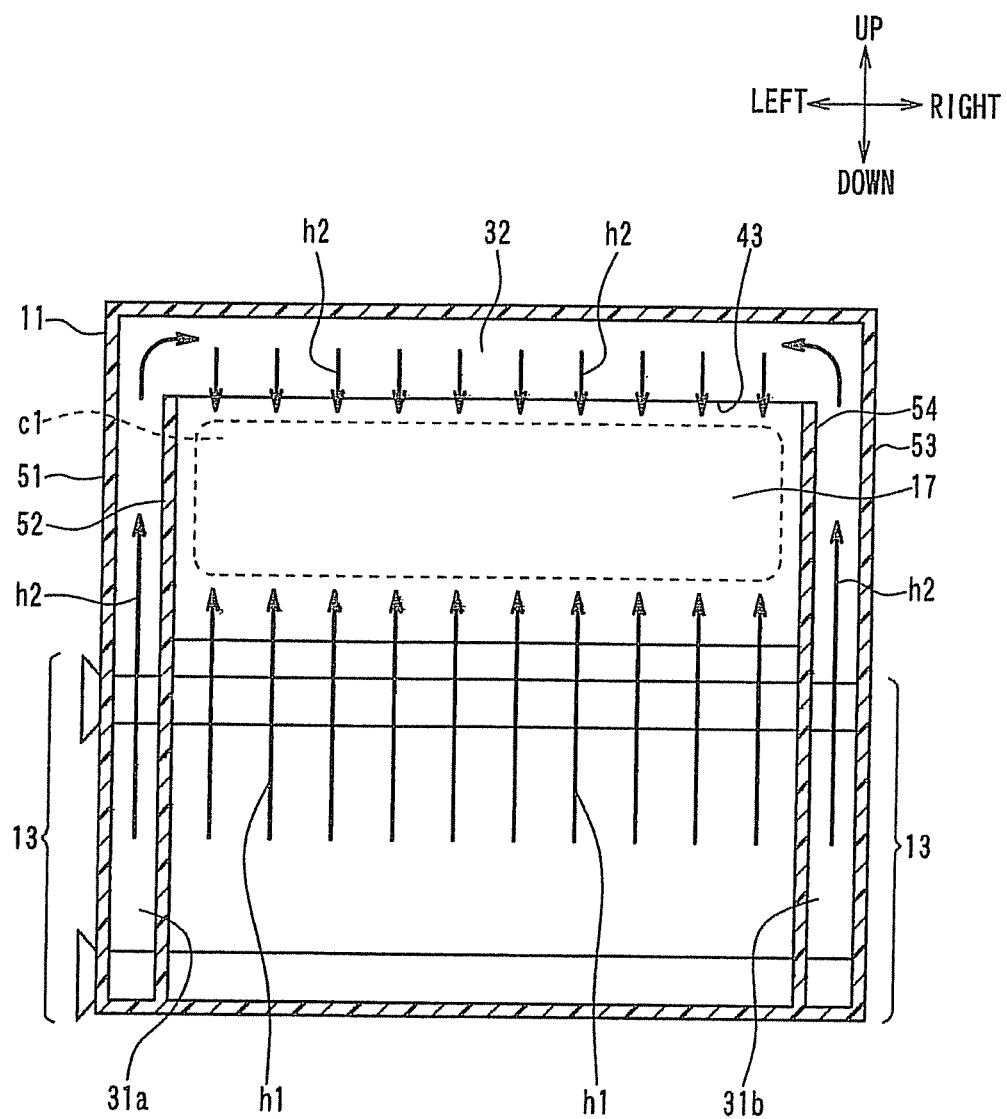
FIG. 6 is a cross-sectional view showing an air conditioner for a vehicle according to a second embodiment of the present invention.

FIG. 6 is a cross-sectional view showing an air conditioner for a vehicle of the present embodiment. FIG. 6 corresponds to FIG. 2. With respect to the corresponding portion to the component in FIG. 2, the same reference numeral is designated.

In the first embodiment, the warm-air bypass passage 31 is located at the center of the air conditioning case 11 in the vehicle width direction as shown in FIG. 2. In contrast, in the present embodiment, warm-air bypass passages 31a, 31b are located at both ends of the air conditioning case 11 in the vehicle width direction as shown in FIG. 6.

The warm-air bypass passage 31a at the left side is formed by an outer wall 51 configuring a left side surface of the air conditioning case 11 and a left-side warm-air partition wall 52 that divides the inside of the air conditioning case 11 in the vehicle width direction. Similarly, the warm-air bypass passage 31b at the right side is formed by an outer wall 53 configuring a right side surface of the air conditioning case 11 and a right-side warm-air partition wall 54 that divides the inside of the air conditioning case 11 in the vehicle width direction.

Also in the present embodiment, as shown in FIG. 6, the warm air flow h2 flowing in the warm-air bypass passages 31a, 31b flows upward and makes a U-turn at the second warm-air passage 32. Then, the warm air flow h2 flows downward from the outlet opening 43 of the second warm-air passage 32 and flows toward the cool air flow c1. Therefore, the similar effect to the first embodiment can be obtained in the present embodiment.

Third Embodiment

Figure 7:
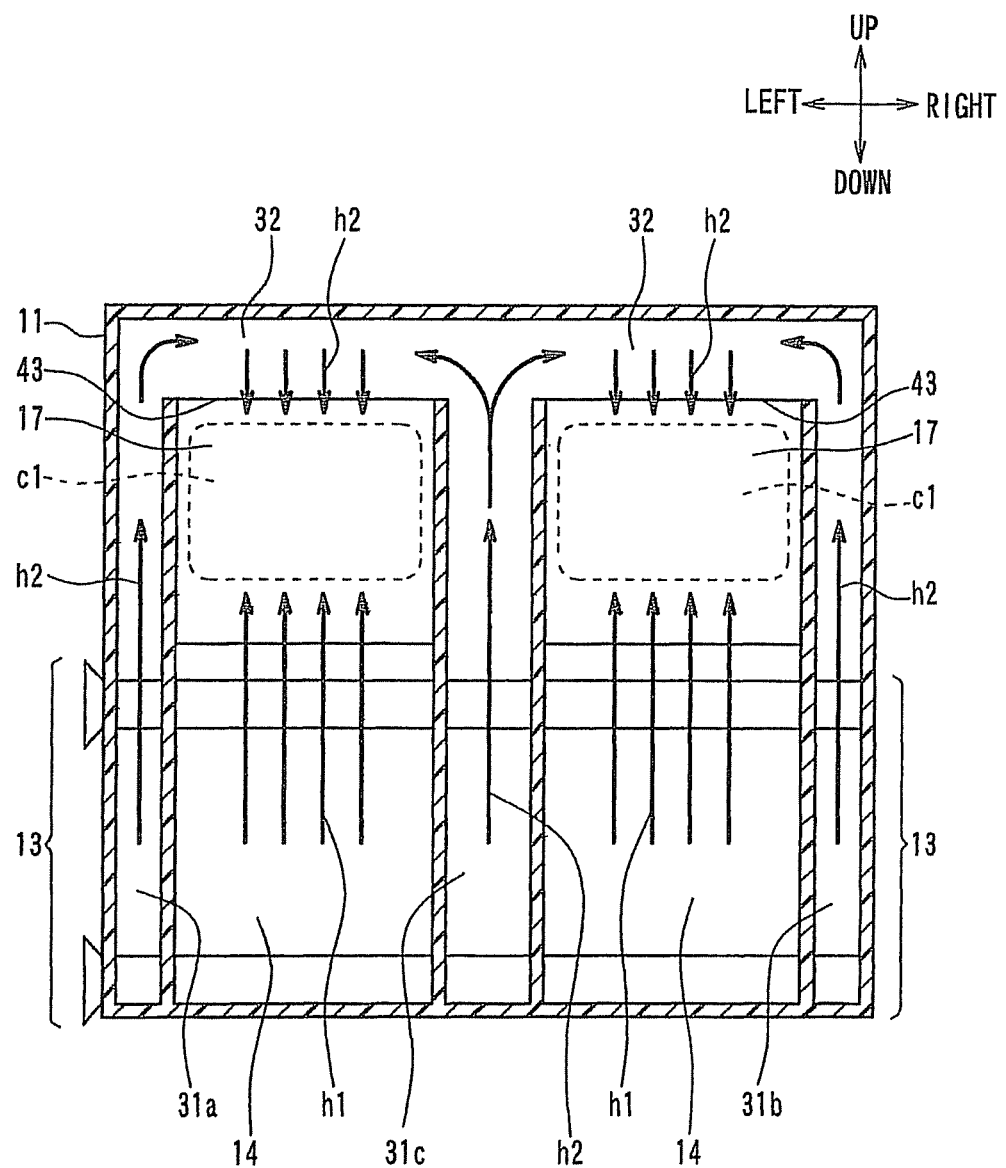
FIG. 7 is a cross-sectional view showing an air conditioner for a vehicle according to a third embodiment of the present invention.

FIG. 7 is a cross-sectional view showing an air conditioner for a vehicle of the present embodiment. FIG. 7 corresponds to FIG. 2. With respect to the corresponding portion to the component in FIG. 2, the same reference numeral is designated.

The present embodiment is the combination of the first embodiment and the second embodiment. In the present embodiment, warm-air bypass passages 31a, 31b, 31c are located at both ends and the center of the air conditioning case 11 in the vehicle width direction as shown in FIG. 7.

The warm-air bypass passages 31a, 31b located at both ends of the air conditioning case 11 have the same configurations with those in the second embodiment, and the warm-air bypass passage 31c located at the center of the air conditioning case 11 has the same configuration with that in the first embodiment. Also in the present embodiment, as shown in FIG. 7, the warm air flow h2 flowing in the warm-air bypass passages 31a, 31b, 31c flows upward and makes a U-turn at the second warm-air passage 32. Then, the warm air flow h2 flows downward from the outlet opening 43 of the second warm-air passage 32 and flows toward the cool air flow c1. Therefore, the similar effect to the first embodiment can be obtained in the present embodiment.

As shown in the first to third embodiments, the arrangement positions of the warm-air bypass passages can be arbitrarily modified in the vehicle width direction, and further the number of the warm-air bypass passages can be arbitrarily modified.

Fourth Embodiment

In the first to third embodiments, the warm air flows h1, h2 flow into the air mixing chamber 17 from both sides of the cool air flow c1 so that the cool air flow c1 is inserted between the warm air flows h1, h2. In contrast, in the present embodiment, cool air flows c1, c2 flow into the air mixing chamber 17 from both sides of a warm air flow h1 so that the warm air flow h1 is inserted between the cool air flows c1, c2.

Figure 8:
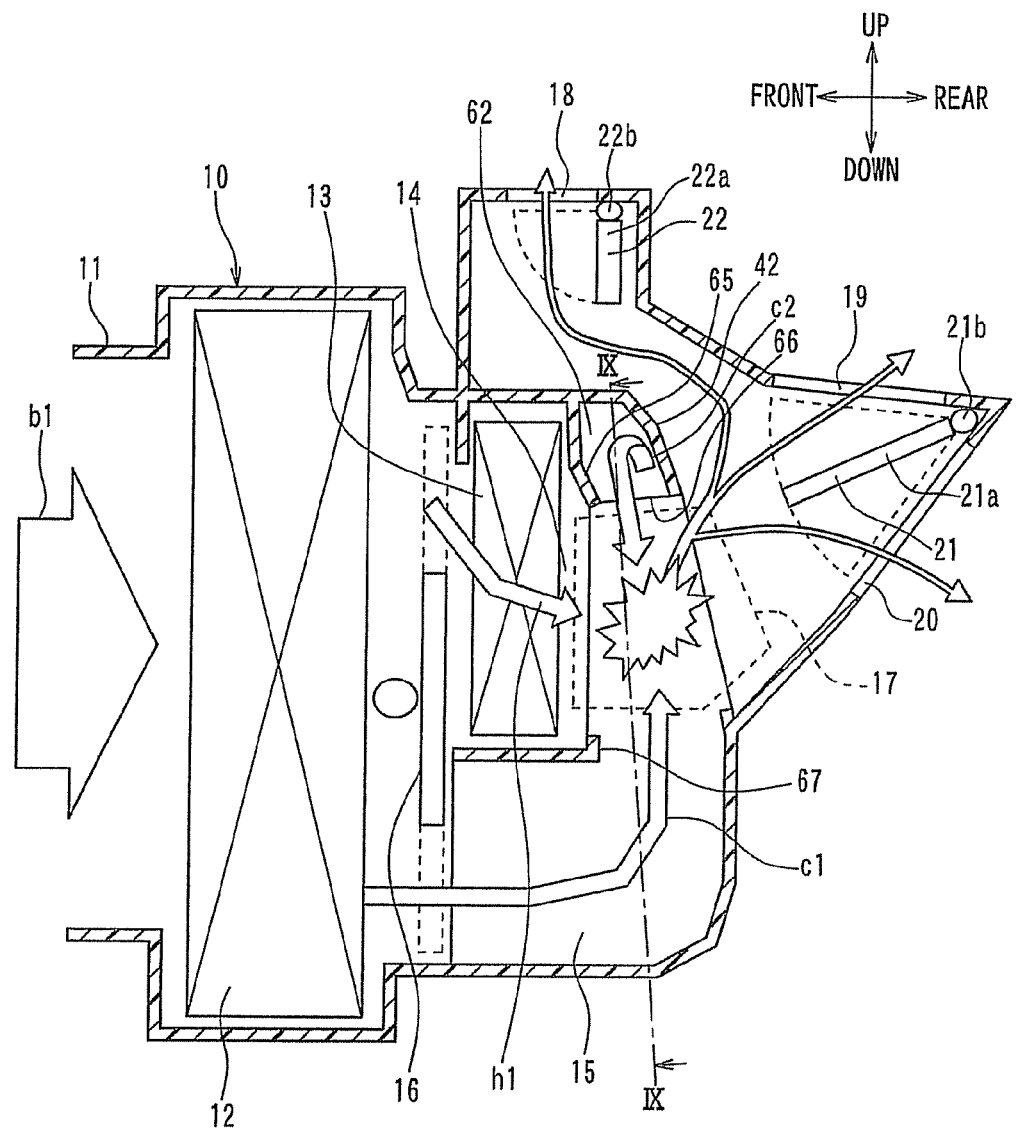
FIG. 8 is a cross-sectional view showing an air conditioner for a vehicle according to a fourth embodiment of the present invention.
Figure 9:
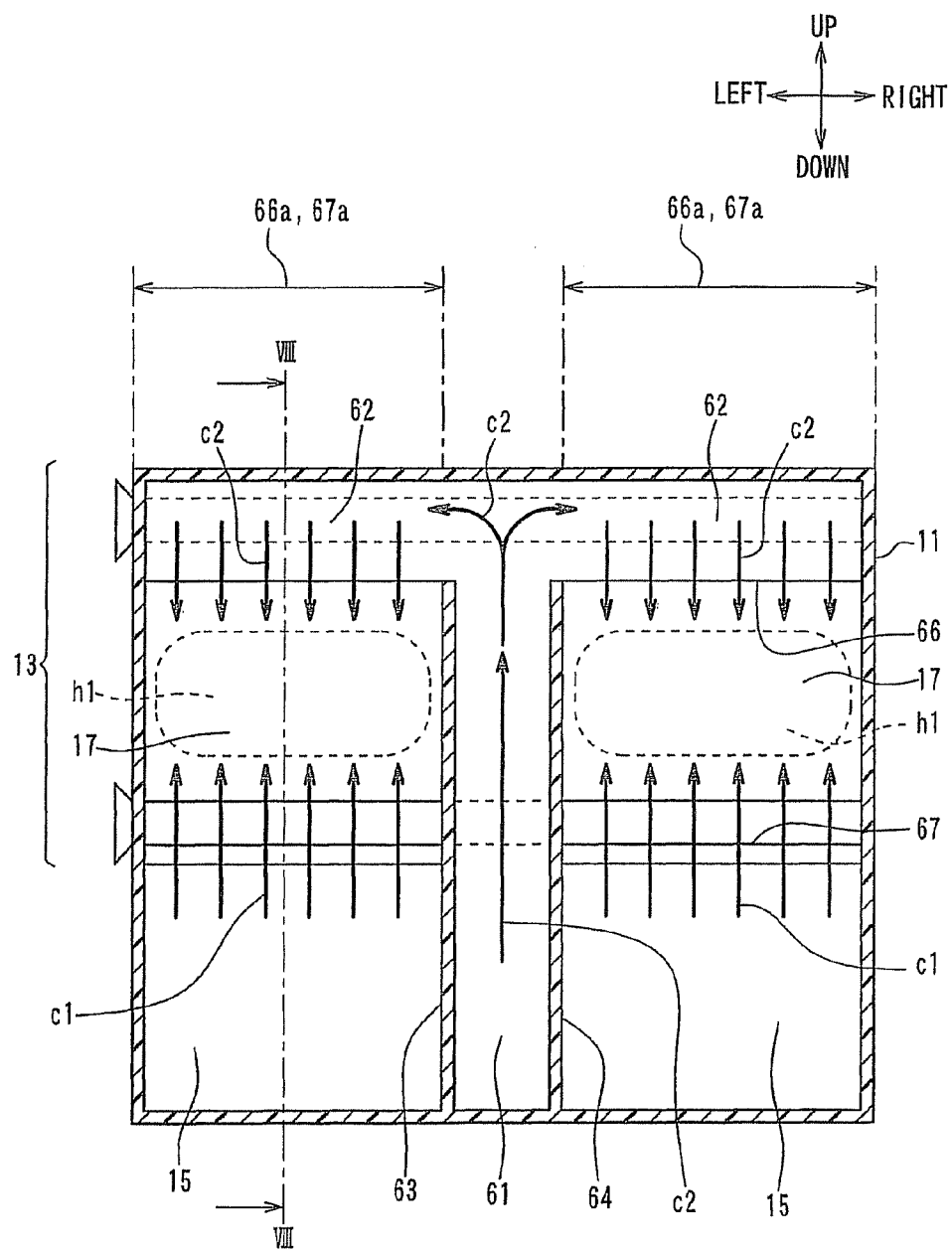
FIG. 9 is a cross-sectional view taken along line IX-IX in FIG. 8.

FIG. 8 is a cross-sectional view showing an air conditioner for a vehicle of the present embodiment. FIG. 9 is a cross-sectional view taken along line IX-IX in FIG. 8. With respect to the corresponding components to those in FIGS. 1 to 4, the same reference numerals are designated in FIGS. 8 and 9.

Compared with the first embodiment, in the present embodiment, the position of the heater core 13 and the position of the cool-air passage 15 are inverted as shown in FIG. 8. The heater core 13 is arranged at an upper side and a first cool-air passage 15 is arranged at a lower side in the air conditioning case 11. The cool air from the evaporator 12 flows through the first cool-air passage 15 while bypassing the heater core 13.

The air mixing chamber 17 is located at a junction of a warm-air passage 14, in which the warm air from the heater core 13 flows, and the first cool-air passage 15. In particular, the air mixing chamber 17 is located at the vehicle rear side of the heater core 13. The warm air flow h1 flowing toward the vehicle rear side from the warm-air passage 14 and the cool air flow c1 flowing upward from the first cool-air passage 15 flow into the air mixing chamber 17 so that the warm air flow h1 from the warm-air passage 14 and the cool air flow c1 from the first cool-air passage 15 are mixed.

As shown in FIG. 9, a cool-air bypass passage 61 and a second cool-air passage 62 are provided inside the air conditioning case 11. The cool-air bypass passage 61 and the second cool-air passage 62 correspond to the warm-air bypass passage 31 and the second warm-air passage 32 in the first embodiment, and the warm air flowing in the passages 31, 32 is changed to the cool air in the present embodiment.

In particular, the cool-air bypass passage 61 introduces a part of the cool air flowing in the first cool-air passage 15 while bypassing the heater core 13 into an area, which is opposite to the first cool-air passage 15 with respect to the air mixing chamber 17, that is, an area above the air mixing chamber 17. The cool-air bypass passage 61 extends across the air mixing chamber 17.

As with the warm-air bypass passage 31 in the first embodiment, the cool-air bypass passage 61 is located at the center of a region including the air mixing chamber 17 in the vehicle width direction inside the air conditioning case 11. As shown in FIGS. 8 and 9, the cool-air bypass passage 61 extends to an upper end portion of the air mixing chamber 17 from just behind the air mixing door 16. Thus, at a portion just behind the air mixing door 16, a part of the cool air from the evaporator 12 flows into the cool-air bypass passage 61 and the rest of the cool air flows into the first cool-air passage 15.

A space including the air mixing chamber 17 inside the air conditioning case 11 is divided by partition walls that define the air mixing chamber 17 and the cool-air bypass passage 61 so that the cool-air bypass passage 61 is formed.

In particular, as shown in FIG. 9, the partition walls include cool-air partition walls 63, 64 that divide the inside of the air conditioning case 11 in the vehicle width direction. Further, the partition walls include a warm-air blocking wall and a cool-air blocking wall (not shown in the drawing) that divide the inside of the air conditioning case 11 into a side of the warm-air passage 14 and a side of the outlet portions 18, 19, 20 at a position corresponding to the air mixing chamber 17.

In contrast, as shown in FIGS. 8 and 9, the second cool-air passage 62 is located above the air mixing chamber 17, and communicates with the cool-air bypass passage 61 at a cool-air flow downstream side. The second cool-air passage 62 is configured such that a direction of a cool air flow c2 flowing in the cool-air bypass passage 61 is changed to a downward direction and the cool air flow c2 flows to the air mixing chamber 17.

As shown in FIG. 8, the second cool-air passage 62 is located between an upper portion of the heater core 13 and a defroster passage for introducing conditioned air into the defroster outlet portion 18. A partition wall 65 configuring a holding portion of the heater core 13 and the defroster partition wall 42 divide the inside of the air conditioning case 11 so that the second cool-air passage 62 is formed.

An outlet opening 66 of the second cool-air passage 62 is opposed to an outlet opening 67 of the first cool-air passage 15. The flowing direction of the cool air from the second cool-air passage 62 is direct opposite to the flowing direction of the cool air from the first cool-air passage 15, and the cool air flows from the outlet opening 66 of the second cool-air passage 62 toward the outlet opening 67 of the first cool-air passage 15.

In the present embodiment, in performing the all outlet portions blowing-mode, the cool air having passed through the evaporator 12 is branched into air flowing toward the heater core 13 and air flowing toward the first cool-air passage 15 and the cool-air bypass passage 61 as shown in FIG. 8.

The warm air flow h1 having passed through the heater core 13 flows toward the vehicle rear side and directly into the air mixing chamber 17. As shown in FIGS. 8 and 9, the cool air flow c1 flowing in the first cool-air passage 15 flows upward from the outlet opening 67 and flows into the air mixing chamber 17. The cool air flow c2 flowing in the cool-air bypass passage 61 flows upward and makes a U-turn at the second cool-air passage 62. Then, the cool air flow c2 flows downward from the outlet opening 66 of the second cool-air passage 62 and flows into the air mixing chamber 17.

Therefore, the cool air flow c1 and the cool air flow c2 flow into the air mixing chamber 17 from two directions, that is, upward and downward directions, so that the warm air flow h1 flowing toward the vehicle rear side is inserted between the cool air flow c1 and the cool air flow c2, and the cool air flow c1, the cool air flow c2 and the warm air flow h1 are mixed.

The cool air and the warm air are mixed in the air mixing chamber 17 to generate conditioned air that is adjusted to a desired temperature. The conditioned air is branched and flows toward the defroster outlet portion 18, the face outlet portion 19 and the foot outlet portion 20. Thus, the conditioned air is blown from the outlet portions 18, 19, 20 to the vehicle compartment.

In the present embodiment, by using the cool-air bypass passage 61 and the second cool-air passage 62, a flowing direction of a part of the cool air from the evaporator 12 is changed from an upward direction to a downward direction after crossing the air mixing chamber 17, and thereby the cool air flows toward the outlet opening 67 of the first cool-air passage 15. Thus, the cool air flow c1 flowing from the first cool-air passage 15, the cool air flow c2 flowing from the second cool-air passage 62 and the warm air flow h1 flowing from the warm-air passage 14 can be mixed in the air mixing chamber 17.

At this time, the cool air flow c1 and the cool air flow c2 flow into the air mixing chamber 17 from the upward and downward directions so that the warm air flow h1 flowing toward the vehicle rear side is inserted between the cool air flow c1 and the cool air flow c2, and thereby the cool air flow c1 and the cool air flow c2 are in contact with upper and lower sides of the warm air flow h1. Thus, a contact area between the warm air and the cool air is increased and air-mixing performance is improved.

Accordingly, in the present embodiment, the conditioned air obtained by mixing the warm air and the cool air in the air mixing chamber 17 can constantly flow to the outlet portions 18, 19, 20 and temperatures of the conditioned air blown from the outlet portions 18, 19, 20 can be equalized.

Also in the present embodiment, as shown in FIG. 9, a dimension 66a of the outlet opening 66 of the second cool-air passage 62 in the vehicle width direction is equal to a dimension 67a of the outlet opening 67, which is opposed to the outlet opening 66, of the first cool-air passage 15 in the vehicle width direction. As in the first embodiment, in the air mixing chamber 17, the warm air flow h1 is inserted between the cool air flow c1 and the cool air flow c2 flowing from the upward and downward directions in the whole vehicle width direction. Therefore, compared to the case where the warm air flow h1 is inserted between the cool air flows only in a part in the vehicle width direction, air-mixing performance can be improved.

The present embodiment is the modified embodiment of the first embodiment. That is, in the present embodiment, the warm air flow and the cool air flow are inverted compared to the first embodiment. Therefore, the air conditioning case 11 can be reduced in size also in the present embodiment.

In the present embodiment, the cool-air bypass passage 61 is located at the center of the air conditioning case 11 in the vehicle width direction as shown in FIG. 9. However, the cool-air bypass passage 61 may be located at both ends of the air conditioning case 11 in the vehicle width direction or may be located at both ends and the center of the air conditioning case 11 in the vehicle width direction as in the second and third embodiments. Further, the number of the cool-air bypass passages 61 may be changed.

Other Embodiments (1) In the first to third embodiments, the flowing direction of the warm air from the warm-air bypass passage 31 is changed to the direct opposite direction with respect to the flowing direction of the warm air from the first warm-air passage 14 by the second warm-air passage 32, and the warm air flows toward the outlet opening 44 of the first warm-air passage 14. However, as long as the warm air flows into the air mixing chamber 17 from the second warm-air passage 32, it is not necessary that the flowing direction is changed to the direct opposite direction. That is, the flowing direction of the warm air from the warm-air bypass passage 31 may be changed to an opposite direction with respect to the flowing direction of the warm air from the first warm-air passage 14 by the second warm-air passage 32 so that the warm air flows toward the air mixing chamber 17. In this case, the conditioned air obtained by mixing the warm air and the cool air in the air mixing chamber 17 can constantly flow to the outlet portions.

Similarly, in the fourth embodiment, the flowing direction of the cool air from the cool-air bypass passage 61, may be changed to an opposite direction with respect to the flowing direction of the cool air from the first cool-air passage 15 by the second cool-air passage 62 so that the cool air flows toward the air mixing chamber 17.

(2) In the first to third embodiments, the flowing direction of air from the cool-air passage 15, the flowing direction of air from the first warm-air passage 14 and the flowing direction of air from the second warm-air passage 32 toward the air mixing chamber 17 are the obliquely downward direction to the vehicle rear side, the obliquely upward direction to the vehicle front side and the obliquely downward direction to the vehicle rear side, respectively. However, the flowing directions are not limited thereto as long as the flowing directions of the warm air from the first and second warm-air passages 14, 32 are not parallel to but intersect with the flowing direction of the cool air from the cool-air passage 15, and the cool air from the cool-air passage 15 is inserted between the warm air from the first and second warm-air passages 14, 32 to flow into the air mixing chamber 17.

Similarly, in the fourth embodiment, the flowing direction of air from the warm-air passage 14, the flowing direction of air from the first cool-air passage 15 and the flowing direction of air from the second cool-air passage 62 toward the air mixing chamber 17 are an approximately parallel direction to the vehicle rear side, an upward direction and a downward direction. However, the flowing directions are not limited thereto as long as the flowing directions of the cool air from the first and second cool-air passages 15, 62 are not parallel to but intersect with the flowing direction of the warm air from the warm-air passage 14, the warm air from the warm-air passage 14 is inserted between the cool air from the first and second cool-air passages 15, 62 to flow into the air mixing chamber 17.

(3) In the first to third embodiments, a warm-air flow upstream end portion of the warm-air bypass passage 31 is located just behind the heater core 13. However, the warm-air flow upstream end portion may be located away from the heater core 13, for example, near a downstream end portion of the first warm-air passage 14. That is, as long as a part of the warm air from the heater core 13 can be introduced into the second warm-air passage 32 across the air mixing chamber 17, a position of the warm-air flow upstream end portion can be arbitrarily changed.

By locating the warm-air flow upstream end portion just behind the heater core 13, the warm air from the heater core 13 can be introduced into the warm-air bypass passage 31 easily. Thus, in terms of introducing the warm air into the warm-air bypass passage 31, it is preferable that the warm-air flow upstream end portion is located just behind the heater core 13 as in the first embodiment.

Similarly, in the fourth embodiment, a cool-air flow upstream end portion of the cool-air bypass passage 61 is located just behind the air mixing door 16. However, the cool-air flow upstream end portion may be located away from the air mixing door 16, for example, near a downstream end portion of the cool-air passage 15.

(4) In the first to third embodiments, the cool-air passage partition wall 41 and the defroster partition wall 42 divide the inside of the air conditioning case 11 so that the second warm-air passage 32 is formed. However, the second warm-air passage 32 may be formed by providing other partition walls inside the air conditioning case 11.

Similarly, in the fourth embodiment, the partition wall 65 configuring the holding portion of the heater core 13 and the defroster partition wall 42 divide the inside of the air conditioning case 11 so that the second cool-air passage 62 is formed. However, the second cool-air passage 62 may be formed by providing other partition walls inside the air conditioning case 11.

(5) In the fourth embodiment, the warm-air passage 14 is located between the heater core 13 and the air mixing chamber 17. However, the air mixing chamber 17 may be located just behind the downstream side of the heater core 13 without the warm-air passage 14.

(6) In the above embodiments, although a sliding door is used as the air mixing door 16, other kinds of doors such as a plate door and a rotary door can be used.

(7) In the above embodiments, the air conditioner includes one air mixing chamber 17 and one air mixing door 16, and conditioned air is introduced from the air mixing chamber 17 into the outlet portions at each of a driver seat side and a front passenger seat side. However, the present invention can be applied to an air conditioner including an air mixing chamber and an air mixing door for a driver seat and an air mixing chamber and an air mixing door for a front passenger seat. In this case, the warm-air bypass passage 31 and the second warm-air passage 32 or the cool-air bypass passage 61 and the second cool-air passage 62 may be arranged for each of the air mixing chambers.

(8) In the above embodiments, the defroster outlet portion 18, the face outlet portion 19 and the foot outlet portion 20 for the front seat are described as an example of the outlet portions. However, the present invention can be applied to an air conditioner including a face outlet portion and a foot outlet portion for the rear seat.

For example, when the conditioned air is blown from the front seat outlet portions and the rear seat outlet portions at the same time, control properties of temperatures of air blowing from all the outlet portions become similar levels by the present invention.

(9) In the above embodiments, the evaporator 12 as a cooling heat exchanger may not be arranged. In this case, air, which is not heated by the heater core 13 while bypassing the heater core 13, flows into the cool-air passage 15. The present invention may be applied to the air conditioner having such configuration.

(10) In the above embodiments, although the room air conditioning unit is constructed of the blower fan unit and the air-conditioning main unit, the room air conditioning unit may be a single unit.

(11) The above embodiments can be combined in various ways.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An air conditioner for a vehicle, comprising:
   an air conditioning case defining an air passage through which air flows to a vehicle compartment; and
   a heating heat exchanger configured to heat the air, the heating heat exchanger being arranged inside the air conditioning case, wherein
   the air passage includes:
      a first warm-air passage in which warm air having passed through the heating heat exchanger flows;
      a cool-air passage in which cool air flows while bypassing the heating heat exchanger;
      an air mixing chamber located at a junction of the first warm-air passage and the cool-air passage such that the warm air flowing from the first warm-air passage and the cool air flowing from the cool-air passage are mixed to obtain conditioned air having a desired temperature;
      a plurality of outlet portions provided at a downstream portion of the air conditioning case downstream of the air mixing chamber in an air flow such that the conditioned air is blown from the plurality of outlet portions to a plurality of regions in the vehicle compartment;
      a warm-air bypass passage configured to introduce a part of the warm air from the heating heat exchanger into a predetermined area, which is opposite to the first warm-air passage with respect to the air mixing chamber, the warm-air bypass passage extending across the air mixing chamber; and
      a second warm-air passage communicating with the warm-air bypass passage, the second warm-air passage being provided at the predetermined area,
   the second warm-air passage is arranged to reverse a flowing direction of the warm air from the warm-air bypass passage and to introduce the warm air into the air mixing chamber, and
   the first warm-air passage and the second warm-air passage are arranged such that the cool air flowing from the cool-air passage to the air mixing chamber is inserted between the warm air flowing in a first direction from the first warm-air passage and the warm air flowing in a second direction, opposite the first direction from the second warm-air passage, from two sides of the cool air in order to enhance mixing.

2. The air conditioner according to claim 1, wherein
   the first warm-air passage has a first outlet opening and the second warm-air passage has a second outlet opening,
   the first outlet opening is opposed to the second outlet opening, and
   the second warm-air passage is arranged such that the warm air flowing in the warm-air bypass passage makes a U-turn and flows toward the first outlet opening.

3. The air conditioner according to claim 2, wherein
   the warm-air bypass passage is arranged in parallel with the first warm-air passage in a vehicle width direction, and
   a dimension of the first outlet opening in the vehicle width direction is equal to a dimension of the second outlet opening in the vehicle width direction.

4. The air conditioner according to claim 1, wherein
   the plurality of outlet portions include a defroster outlet portion, a face outlet portion and a foot outlet portion.

5. The air conditioner according to claim 4, further comprising:
   a cool-air passage partition wall arranged inside the air conditioning case configured to provide the cool-air passage; and
   a defroster partition wall arranged inside the air conditioning case configured to introduce the conditioned air into the defroster outlet portion, wherein
   the cool-air passage partition wall and the defroster partition wall are provided to define the second warm-air passage therebetween.

6. An air conditioner for a vehicle, comprising:
   an air conditioning case defining an air passage through which air flows to a vehicle compartment; and
   a heating heat exchanger configured to heat the air, the heating heat exchanger being arranged inside the air conditioning case, wherein
   the air passage includes:
      a warm-air passage in which the heating heat exchanger is arranged;
      a first cool-air passage in which cool air flows while bypassing the heating heat exchanger;
      an air mixing chamber located at a junction of the warm-air passage and the first cool-air passage such that a warm air flowing from the heating heat exchanger and the cool air flowing from the first cool-air passage are mixed to obtain conditioned air having a desired temperature;
      a plurality of outlet portions provided at a downstream portion of the air conditioning case downstream of the air mixing chamber in an air flow such that the conditioned air is blown from the plurality of outlet portions to a plurality of regions in the vehicle compartment;
      a cool-air bypass passage configured to introduce a part of the cool air flowing in the first cool-air passage while bypassing the heater core into a predetermined area, which is opposite to the first cool-air passage with respect to the air mixing chamber, the cool-air bypass passage extending across the air mixing chamber; and a second cool-air passage communicating with the cool-air bypass passage, the second cool-air passage being provided at the predetermined area, the second cool-air passage is arranged to reverse a flowing direction of the cool air from the cool-air bypass passage and to introduce the cool air into the air mixing chamber, and the first cool-air passage and the second cool-air passage are arranged such that the warm air flowing from the heating heat exchanger to the air mixing chamber is inserted between the cool air flowing in a first direction from the first cool-air passage and the cool air lowing in a second direction, opposite the first direction from the second cool-air passage, from two sides of the warm air in order to enhance mixing.

7. The air conditioner according to claim 6, wherein the first cool-air passage has a first outlet opening and the second cool-air passage has a second outlet opening, the first outlet opening is opposed to the second outlet opening, and the second cool-air passage is arranged such that the cool air flowing in the cool-air bypass passage makes a U-turn and flows toward the first outlet opening.

8. The air conditioner according to claim 7, wherein the cool-air bypass passage is arranged in parallel with the first cool-air passage in a vehicle width direction, and a dimension of the first outlet opening in the vehicle width direction is equal to a dimension of the second outlet opening in the vehicle width direction.

9. The air conditioner according to claim 6, wherein the plurality of outlet portions include a defroster outlet portion, a face outlet portion and a foot outlet portion.

10. The air conditioner according to claim 9, further comprising:

a partition wall arranged inside the air conditioning case configured to provide a holding portion of the heating heat exchanger; and a defroster partition wall arranged inside the air conditioning case configured to introduce the conditioned air into the defroster outlet portion, wherein the partition wall and the defroster partition wall are provided to define the second cool-air passage therebetween.

* * * * *